United States Patent
Kamio

(10) Patent No.: US 11,226,037 B2
(45) Date of Patent: Jan. 18, 2022

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 430 days.

(21) Appl. No.: 16/292,630

(22) Filed: Mar. 5, 2019

(65) Prior Publication Data

US 2019/0195357 A1  Jun. 27, 2019

Related U.S. Application Data

(63) Continuation of application No. PCT/JP2017/032366, filed on Sep. 7, 2017.

(30) Foreign Application Priority Data

Sep. 9, 2016  (JP) .............................. JP2016-176279

(51) Int. Cl.

| F16H 61/32 | (2006.01) |
|---|---|
| H02P 3/24 | (2006.01) |
| H02P 6/08 | (2016.01) |
| H02P 3/06 | (2006.01) |

(Continued)

(52) U.S. Cl.
CPC ........... *F16H 61/32* (2013.01); *F16H 59/105* (2013.01); *H02P 3/06* (2013.01); *H02P 3/24* (2013.01); *H02P 6/08* (2013.01); *H02P 6/24* (2013.01); *F16H 2061/326* (2013.01)

(58) Field of Classification Search
CPC .. F16H 61/32; F16H 59/105; F16H 2061/326; H02P 3/06; H02P 6/24; H02P 3/24; H02P 6/08

See application file for complete search history.

(56) References Cited

U.S. PATENT DOCUMENTS

| 4,019,107 A * | 4/1977 | Dixon | ................... H02P 7/2985 |
| | | | 388/806 |
| 5,428,285 A * | 6/1995 | Koyama | ................ G05B 17/02 |
| | | | 318/560 |

(Continued)

FOREIGN PATENT DOCUMENTS

| JP | 9-271200 | 10/1997 |
| JP | 10-143250 | 5/1998 |

(Continued)

OTHER PUBLICATIONS

U.S. Appl. No. 16/093,158, filed Oct. 12, 2018 to Kamio (34 pages).

*Primary Examiner* — Muhammad S Islam
*Assistant Examiner* — Devon A Joseph
(74) *Attorney, Agent, or Firm* — Nixon & Vanderhye P.C.

(57) ABSTRACT

A shift range switching control device for switching a shift range by controlling driving of a motor includes a feedback control section, a stationary phase energization control section, and a switching control section. The feedback control section performs a feedback control based on an actual angle of the motor, and a motor speed. The stationary phase energization control section performs a stationary phase energization control which energizes a stationary phase selected according to the actual angle. The switching control section switches the control state of the motor.

7 Claims, 11 Drawing Sheets

(51) Int. Cl.
*F16H 59/10* (2006.01)
*H02P 6/24* (2006.01)

(56) References Cited

U.S. PATENT DOCUMENTS

| | | | | |
|---|---|---|---|---|
| 5,469,215 | A * | 11/1995 | Nashiki | H02P 6/10 |
| | | | | 318/432 |
| 5,796,228 | A * | 8/1998 | Kojima | H02P 25/03 |
| | | | | 318/605 |
| 6,081,093 | A * | 6/2000 | Oguro | H02P 21/04 |
| | | | | 318/801 |
| 6,359,415 | B1 * | 3/2002 | Suzuki | H02P 21/00 |
| | | | | 318/727 |
| 6,646,409 | B2 * | 11/2003 | Won | H02P 25/089 |
| | | | | 318/701 |
| 6,954,050 | B2 * | 10/2005 | Tobari | H02P 6/18 |
| | | | | 318/453 |
| 7,245,104 | B2 * | 7/2007 | Tomigashi | H02P 21/22 |
| | | | | 318/700 |
| 7,573,227 | B2 * | 8/2009 | Kasaoka | H02P 21/0089 |
| | | | | 318/701 |
| 7,839,113 | B2 * | 11/2010 | Maeda | H02P 21/06 |
| | | | | 318/721 |
| 9,050,895 | B2 * | 6/2015 | Kobayashi | H02P 6/16 |
| 9,342,057 | B2 * | 5/2016 | Kira | H02P 6/28 |
| 9,397,602 | B2 * | 7/2016 | Takaki | H02P 21/26 |
| 9,948,223 | B2 * | 4/2018 | Ishida | H02P 21/10 |
| 2004/0008002 | A1 * | 1/2004 | Kamio | H02P 6/12 |
| | | | | 318/701 |
| 2004/0066166 | A1 * | 4/2004 | Nakai | F16H 61/32 |
| | | | | 318/701 |
| 2005/0066759 | A1 * | 3/2005 | Hirota | F16H 59/105 |
| | | | | 74/473.1 |
| 2005/0174084 | A1 * | 8/2005 | Nakai | F16H 61/32 |
| | | | | 318/632 |
| 2006/0006827 | A1 | 1/2006 | Nakai et al. | |
| 2006/0108966 | A1 | 5/2006 | Kamio et al. | |
| 2008/0224645 | A1 * | 9/2008 | Ide | H02P 21/18 |
| | | | | 318/608 |
| 2013/0234633 | A1 * | 9/2013 | Bateman | H02P 6/26 |
| | | | | 318/400.06 |
| 2014/0055074 | A1 * | 2/2014 | Yoshiura | G05B 11/42 |
| | | | | 318/610 |
| 2015/0222211 | A1 * | 8/2015 | Maruo | H02P 23/0027 |
| | | | | 318/612 |
| 2016/0313721 | A1 * | 10/2016 | Tazawa | G05B 19/19 |
| 2017/0111529 | A1 * | 4/2017 | Sato | H04N 1/00652 |

FOREIGN PATENT DOCUMENTS

| | | |
|---|---|---|
| JP | 11-282538 | 10/1999 |
| JP | 2004-19804 | 1/2004 |
| WO | 2017/179337 | 10/2017 |

* cited by examiner

SHIFT RANGE CONTROL DEVICE

CROSS REFERENCE TO RELATED APPLICATIONS

The present application is a continuation application of International Patent Application No. PCT/JP2017/032366 filed on Sep. 7, 2017, which designated the U.S. and claims the benefit of priority from Japanese Patent Application No. 2016-176279 filed on Sep. 9, 2016. The entire disclosures of all of the above applications are incorporated herein by reference.

TECHNICAL FIELD

The present disclosure relates to a shift range control device.

BACKGROUND

It has been known a shift range switching device that switches a shift range by controlling a motor in accordance with a shift range switching request given from a driver. For example, a switched reluctance motor is used as a drive source of a shift range switching mechanism. The switched reluctance motor is hereinafter referred to as "SR motor".

SUMMARY

The present disclosure provides a shift range control device that controls a driving of a motor to switch a shift range, and performs a feedback control of the motor based on an actual angle of the motor and a motor speed.

BRIEF DESCRIPTION OF DRAWINGS

The above and other objects, features and advantages of the present disclosure will become more apparent from the following detailed description made with reference to the accompanying drawings, in which.

DETAILED DESCRIPTION

Figure 1:
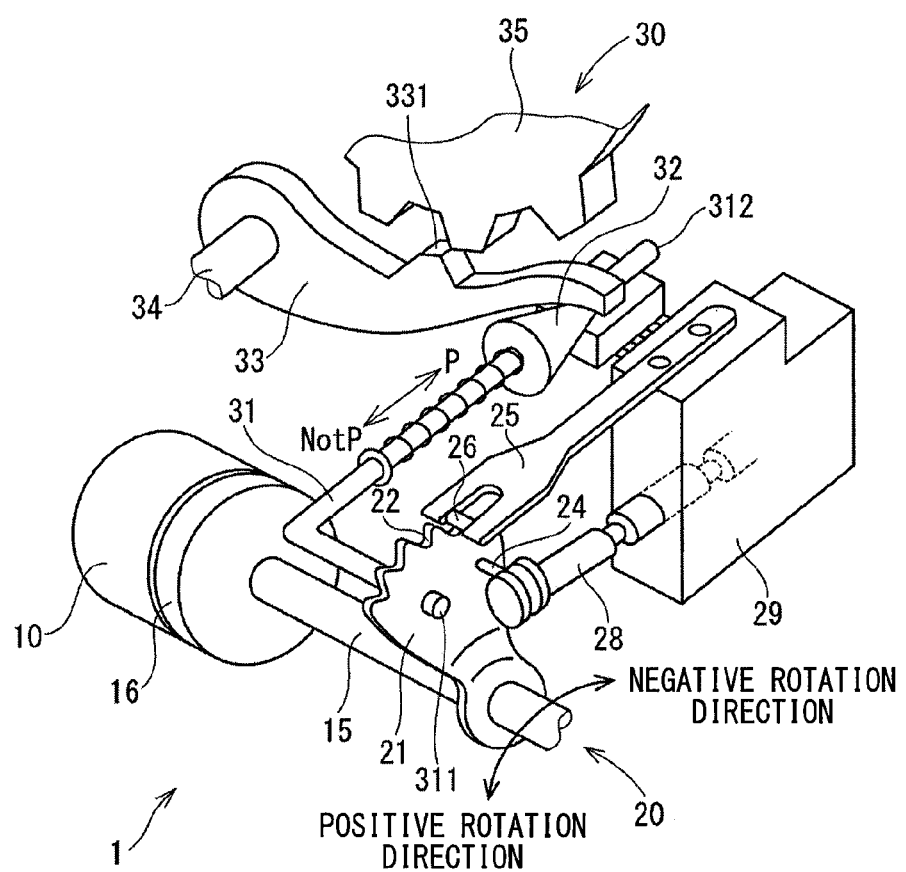
FIG. 1 is a perspective view showing a shift-by-wire system according to a first embodiment.

As a drive source of a shift range switching mechanism, for example, the SR is used. The SR motor not including a permanent magnet has a simple structure. On the other hand, a motor including a permanent magnet, such as a direct current (DC) brushless motor, exhibits higher responsiveness than that of the SR motor. However, when a feedback gain is raised to increase responsiveness, hunting may be caused by an effect of cogging torque or the like at a stop of the motor.

According to an aspect of the present disclosure, a shift range control device for switching a shift range by controlling driving of a motor includes a feedback control section, a stationary phase energization control section, and a switching control section.

The feedback control section performs a feedback control based on an actual angle of the motor, and a motor speed which is a rotation speed of the motor. The stationary phase energization control section performs a stationary phase energization control to energize a stationary phase selected according to the actual angle. The switching control section switches a control state of the motor.

When a request shift range is switched, the switching control section switches the control state to the feedback control. When an angular deviation, which is a deviation between a target angle determined according to the request shift range and the actual angle, becomes equal to or smaller than an angle determination threshold, the switching control section switches the control state from the feedback control to the stationary phase energization control.

According to such a configuration, responsiveness can be improved by selecting the feedback control when the request shift range is switched. Furthermore, the motor can be appropriately stopped by switching the feedback control to the stationary phase energization control when the actual angle approaches the target angle. In this manner, driving of the motor associated with switching of the shift range can be appropriately controlled.

Embodiments of the present disclosure will be hereinafter described with reference to the drawings. In a plurality of embodiments described herein, substantially identical components are given identical reference numerals, and are not repeatedly explained.

First Embodiment

FIGS. 1 to 9 show a shift range control device according to a first embodiment.

Figure 2:
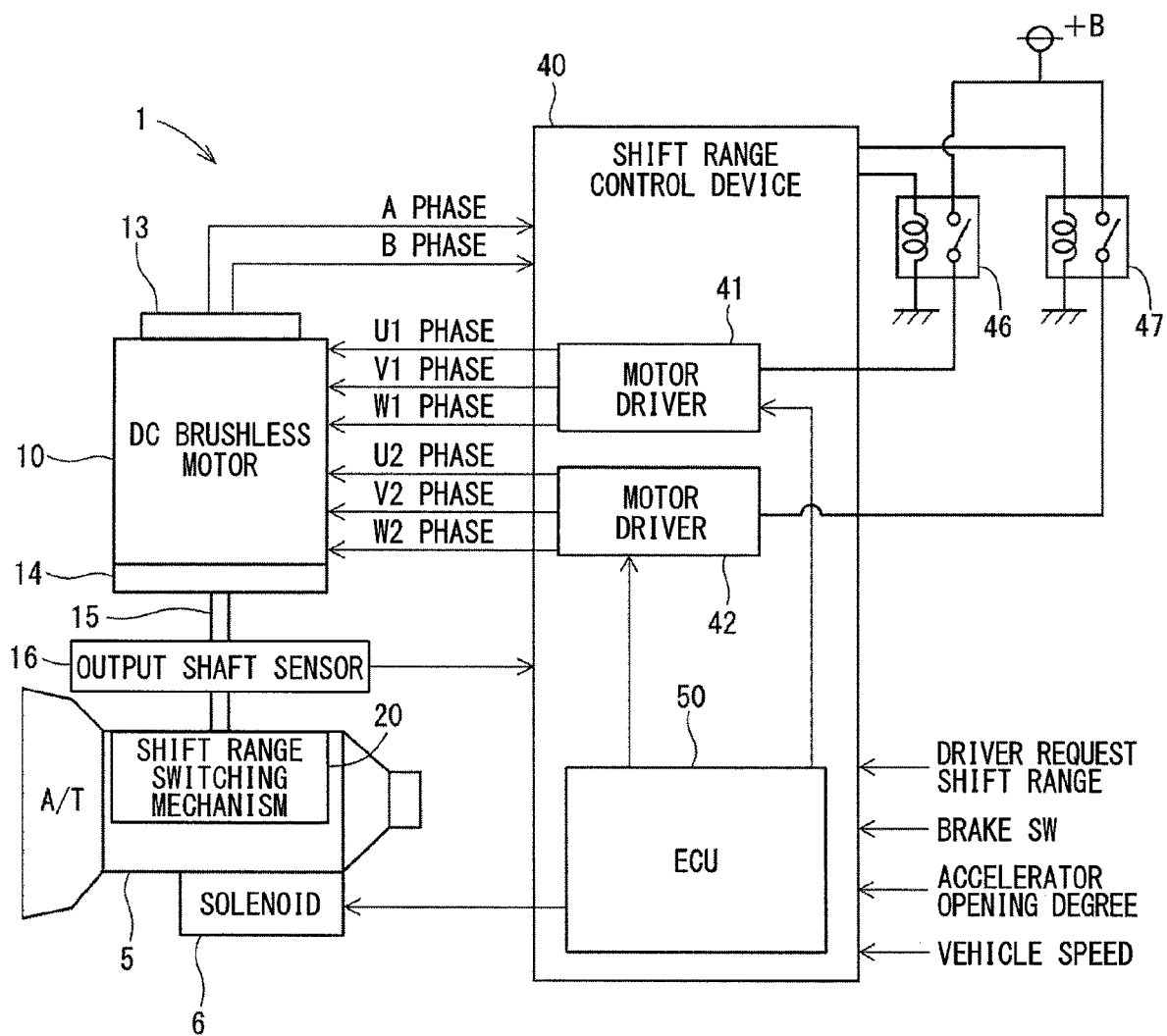
FIG. 2 is a schematic configuration diagram showing the shift-by-wire system according to the first embodiment.

As shown in FIGS. 1 and 2, a shift-by-wire system 1 includes a motor 10, a shift range switching mechanism 20, a parking lock mechanism 30, a shift range control device 40, and others.

Figure 3:
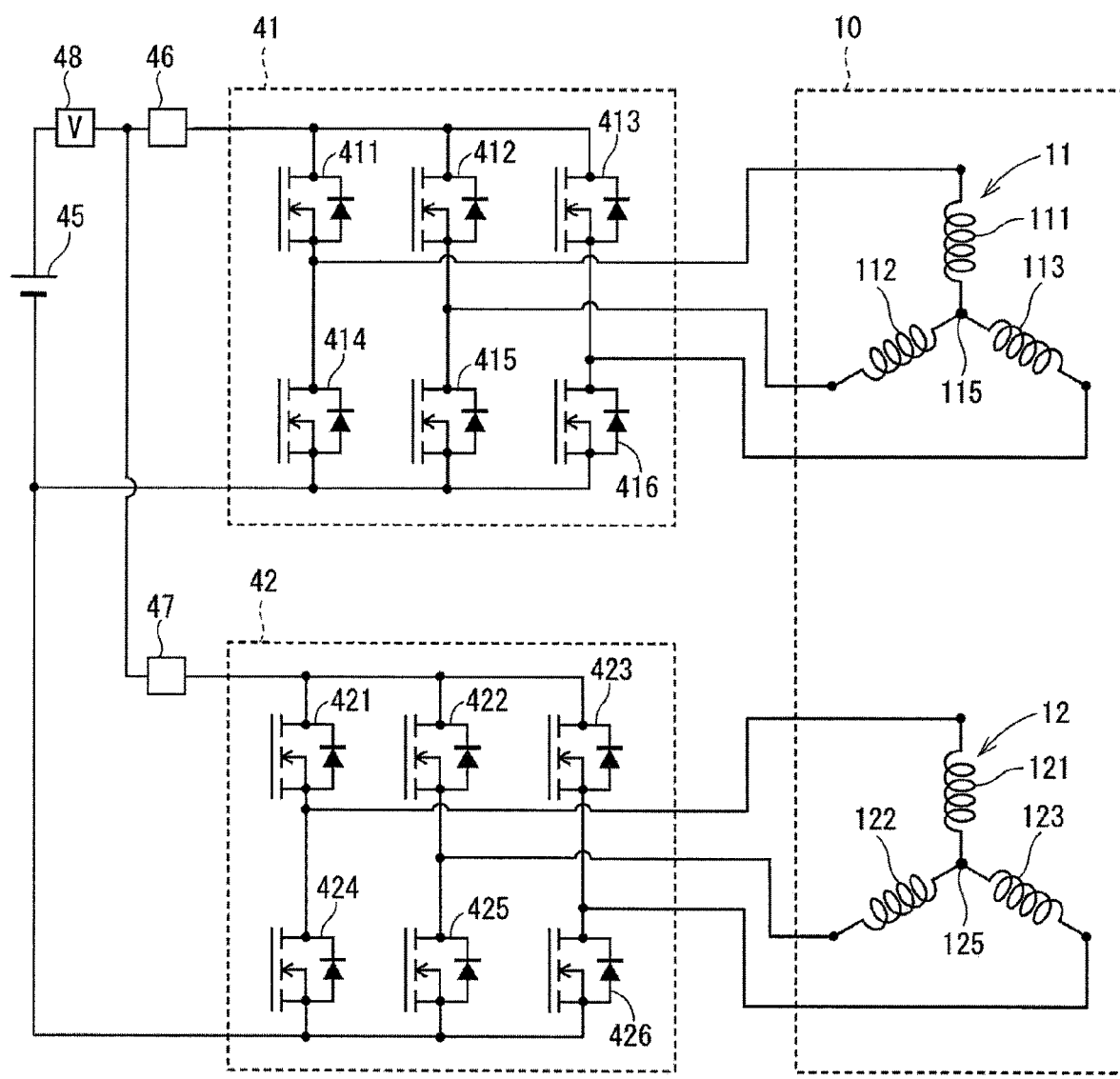
FIG. 3 is a circuit diagram showing a motor and a motor driver according to the first embodiment.
Figure 4:
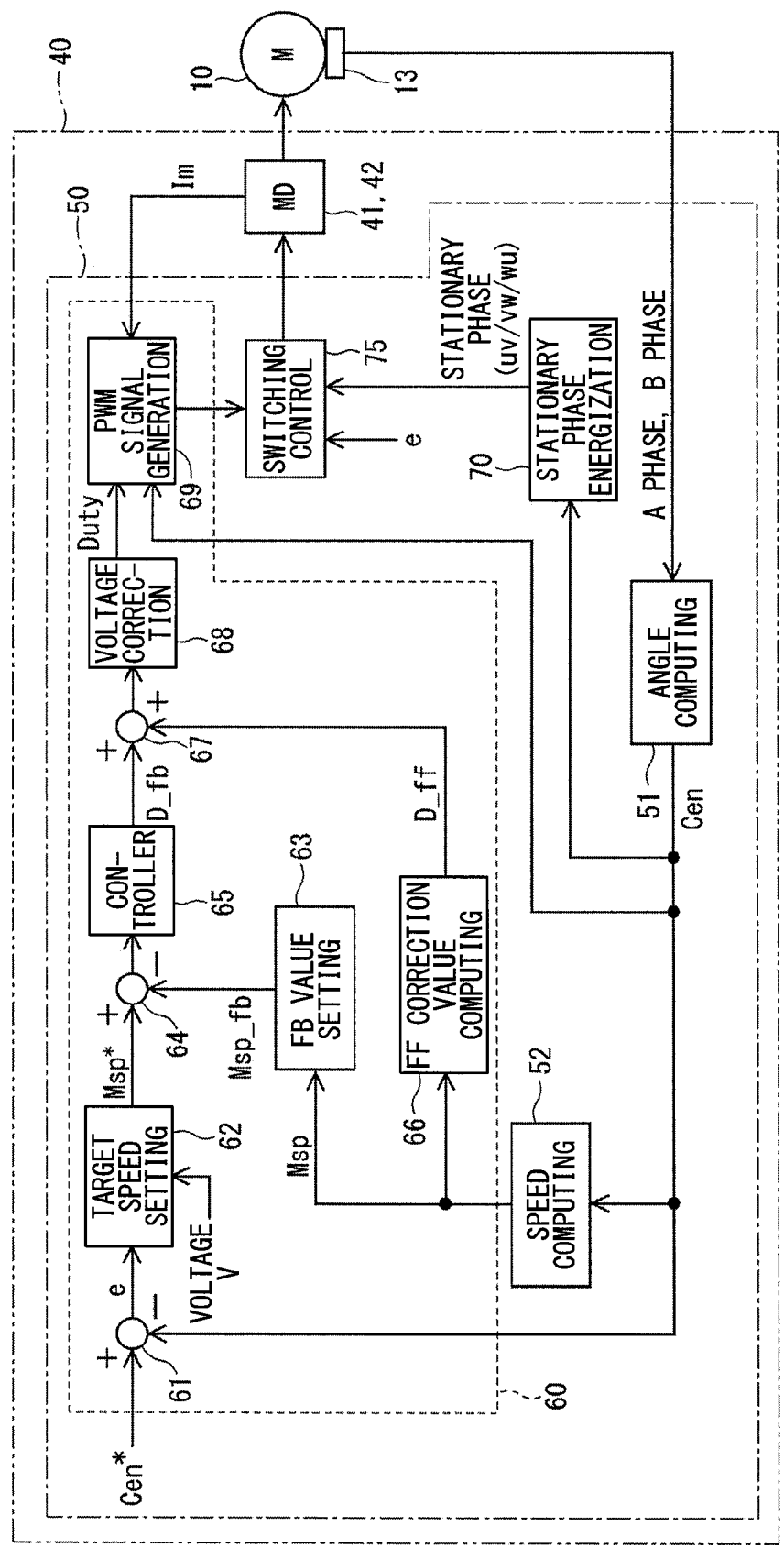
FIG. 4 is a block diagram showing a shift range control device according to the first embodiment.
Figure 5:
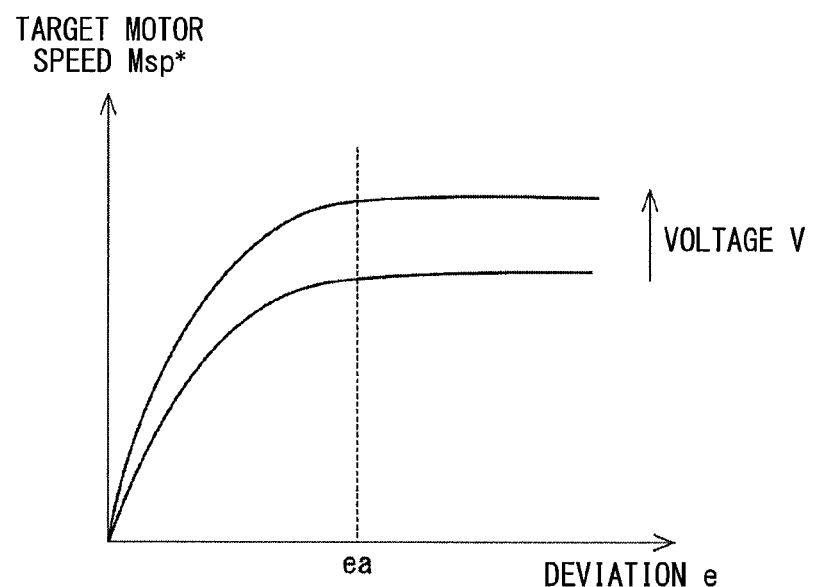
FIG. 5 is an explanatory diagram showing a target speed setting according to the first embodiment.

The motor 10 rotates when receiving electric power from a battery 45 (see FIG. 3) mounted on a not-shown vehicle to function as a drive source of the shift range switching mechanism 20. The motor 10 is capable of changing the value of current by feedback control, and capable of changing a command for each phase. The motor 10 of the present embodiment is a permanent magnet DC brushless motor. As shown in FIG. 3, the motor 10 includes two pairs of winding sets 11 and 12. The first winding set 11 has a U1 coil 111, a V1 coil 112, and a W1 coil 113. The second winding set 12 has a U2 coil 121, a V2 coil 122, and a W2 coil 123.

As shown in FIG. 2, an encoder 13 detects a rotational position of a not-shown rotor of the motor 10. For example, the encoder 13 is a magnetic rotary encoder, and is constituted by a magnet which rotates with the rotor as one body, a Hall integrated circuit (IC) for magnetism detection, and others. The encoder 13 outputs pulse signals of A phase and B phase at predetermined angular intervals in synchronization with rotation of the rotor.

A speed reducer 14 is provided between a motor shaft and an output shaft 15 of the motor 10 to reduce a rotation speed of the motor 10 and output the rotation to the output shaft 15. In this manner, the rotation of the motor 10 is transmitted to the shift range switching mechanism 20. An output shaft sensor 16 for detecting an angle of the output shaft 15 is provided on the output shaft 15. For example, the output shaft sensor 16 is a potentiometer.

As shown in FIG. 1, the shift range switching mechanism 20 includes a detent plate 21, a detent spring 25, and others, and transmits a rotational driving force output from the speed reducer 14 to a manual valve 28 and the parking lock mechanism 30.

The detent plate 21 is fixed to the output shaft 15 and driven by the motor 10. In the present embodiment, a direction in which the detent plate 21 moves away from a base portion of the detent spring 25 is defined as a positive rotation direction, and a direction in which the detent plate 21 moves toward the base portion is defined as a negative rotation direction.

The detent plate 21 includes a pin 24 projecting in parallel with the output shaft 15. The pin 24 is connected to the manual valve 28. When the detent plate 21 is driven by the motor 10, the manual valve 28 reciprocates in an axial direction. More specifically, the shift range switching mechanism 20 converts rotational movement of the motor 10 into linear movement, and transmits the linear movement to the manual valve 28. The manual valve 28 is included in a valve body 29. When the manual valve 28 reciprocates in the axial direction, a hydraulic pressure supply path to a not-shown hydraulic clutch is switched to change an engagement state of the hydraulic clutch. In this manner, switching of a shift range is achieved.

Four recesses 22 each for holding the manual valve 28 in a position corresponding to an associated range are formed in a region of the detent plate 21 adjacent to the detent spring 25. The recesses 22 are formed in correspondence with ranges of D, N, R, and P from the base portion side of the detent spring 25, respectively.

The detent spring 25 is an elastically deformable plate-shaped member. A detent roller 26 is provided at a tip of the detent spring 25. The detent roller 26 fits to one of the recesses 22.

The detent spring 25 urges the detent roller 26 toward the rotation center of the detent plate 21. When a rotational force equal to or larger than a predetermined force is applied to the detent plate 21, the detent spring 25 is elastically deformed. As a result, the detent roller 26 moves along the recesses 22. When the detent roller 26 is fitted to any of the recesses 22, swing of the detent plate 21 is regulated. Accordingly, the axial position of the manual valve 28 and the state of the parking lock mechanism 30 are determined to fix a shift range of an automatic transmission 5.

The parking lock mechanism 30 includes a parking rod 31, a cone 32, a parking lock pole 33, a shaft portion 34, and a parking gear 35.

The parking rod 31 has a substantially L shape. One end 311 of the parking rod 31 is fixed to the detent plate 21. The cone 32 is provided at an opposite end 312 of the parking rod 31. The cone 32 has a diameter which decreases toward the opposite end 312. When the detent plate 21 swings in the negative rotation direction, the cone 32 moves in a direction of an arrow P.

The parking lock pole 33 abuts a conical surface of the cone 32 and swings around the shaft portion 34. The parking lock pole 33 includes a protrusion 331 engageable with the parking gear 35 and located at a position adjacent to the parking gear 35. When the cone 32 moves in the direction of the arrow P by rotation of the detent plate 21 in the negative rotation direction, the parking lock pole 33 is pushed up to achieve engagement between the protrusion 331 and the parking gear 35. On the other hand, when the cone 32 moves in a direction of an arrow NotP by rotation of the detent plate 21 in the positive rotation direction, the engagement between the protrusion 331 and the parking gear 35 is released.

The parking gear 35 is provided on a not-shown axle in such a manner as to be engageable with the protrusion 331 of the parking lock pole 33.

Rotations of the axle are regulated during engagement between the parking gear 35 and the protrusion 331. At the time of a shift range other than P range, i.e., non-P range, the parking gear 35 is not locked by the parking lock pole 33. In this condition, rotations of the axle are not regulated by the parking lock mechanism 30. During the shift range of P range, the parking gear 35 is locked by the parking lock pole 33. In this condition, rotations of the axle are regulated.

As shown in FIGS. 2 and 3, the shift range control device 40 includes motor drivers 41 and 42, an electronic control unit (ECU) 50, and others. The motor driver 41 is a three-phase inverter that switches energization of the first winding set 11, and is bridge-connected with switching elements 411 to 416. One end of the U1 coil 111 is connected to a connection point between the pair of U-phase switching elements 411 and 414. One end of the V1 coil 112 is connected to a connection point between the pair of V-phase switching elements 412 and 415. One end of the W1 coil 113 is connected to a connection point between the pair of W-phase switching elements 413 and 416. Opposite ends of the coils 111 to 113 are connected by a connection portion 115.

The motor driver 42 is a three-phase inverter that switches energization of the second winding set 12, and is bridge-connected with switching elements 421 to 426. One end of the U2 coil 121 is connected to a connection point between the pair of U-phase switching elements 421 and 424. One end of the V2 coil 122 is connected to a connection point between the pair of V-phase switching elements 422 and 425. One end of the W2 coil 123 is connected to a connection point between the pair of W-phase switching elements 423 and 426. Opposite ends of the coils 121 to 123 are connected by a connection portion 125.

The switching elements 411 to 416 and 421 to 426 in the present embodiment, which are metal-oxide silicon field-effect transmitters (MOSFETs), may be constituted by other elements such as insulated gate bipolar transistors (IGBTs).

A motor relay 46 is provided between the motor driver 41 and the battery 45. A motor relay 47 is provided between the motor driver 42 and the battery 45. While a starting switch such as an ignition switch is turned on, the motor relays 46 and 47 are turned on to supply electric power to the motor 10. While the starting switch is turned off, the motor relays 46 and 47 are turned off to stop supply of electric power to the motor 10.

A voltage sensor 48 for detecting a battery voltage V is provided on the high potential side of the battery 45.

A not-shown current sensor for detecting a motor current Im is provided on each of the motor drivers 41 and 42.

The ECU 50 controls driving of the motor 10 by controlling on and off operations of the switching elements 411 to 416, and 421 to 426. The ECU 50 further controls driving of shift hydraulic pressure control solenoids 6 based on a vehicle speed, an accelerator opening degree, a driver request shift range, or the like. The gear position is controlled by controlling the shift hydraulic pressure control solenoids 6. The number of the provided shift hydraulic pressure control solenoids 6 is determined in accordance with the number of shift positions or the like. In the present embodiment, the one ECU 50 controls driving of the motor 10 and the solenoids 6. However, a motor ECU for a motor control provided for controlling the motor 10 may be provided separately from an AT-ECU for a solenoid control. Driving control of the motor 10 will be hereinafter chiefly described.

The ECU 50 includes an angle computing section 51, a speed computing section 52, a feedback control section 60, a stationary phase energization control section 70, a switching control section 75, and others, and is chiefly constituted by a microcomputer or the like. Each processing performed by the ECU 50 may be software processing executed by the CPU under a program stored in advance in a substantial memory device such as ROM, or hardware processing executed by a dedicated electronic circuit.

The angle computing section 51 computes an actual count value Cen, which is a count value of the encoder 13, based on A-phase and B-phase pulses output from the encoder 13. The actual count value Cen is a value corresponding to an actual mechanical angle and an electrical angle of the motor 10. In the present embodiment, the actual count value Cen is designated as an "actual angle".

The speed computing section 52 computes a motor speed Msp, which is a rotation speed of the motor 10, based on the actual count value Cen.

The feedback control section 60 includes an angular deviation computing section 61, a target speed setting section 62, a feedback value setting section 63, a speed deviation computing section 64, a controller 65, a feedforward correction value computing section 66, a feedforward term correction section 67, a voltage correction section 68, and a pulse width modulation (PWM) signal generation section 69. Hereinafter, feedback is referred to as "FB", while feedforward is referred to as "FF" where appropriate.

The angular deviation computing section 61 computes a difference between a target count value Cen*, which corresponds to a driver request shift range input by operation of a not-shown shift lever or the like, and the actual count value Cen. An absolute value of a difference between the target count value Cen* and the actual count value Cen is hereinafter referred to as an angular deviation e.

The target speed setting section 62 computes a target motor speed Msp*, which is a target speed of the motor 10, based on the angular deviation e. With reference to a map shown in FIG. 5, for example, the target motor speed Msp* is set to a larger speed as the angular deviation e increases in a case where the angular deviation e is equal to or smaller than a predetermined value ea, and is set to a predetermined maximum value in a case where the angular deviation e is larger than the predetermined value ea. In addition, the target motor speed Msp* is set to a larger value as the battery voltage V rises.

The FB value setting section 63 sets a speed feedback value Msp_fb for feedback in accordance with a speed state of the motor 10.

In the present embodiment, the speed state of the motor 10 includes an acceleration state, a steady state, and a deceleration state. A speed mode corresponding to the speed state includes "mode 1" for the acceleration state, "mode 2" for the steady state, and "mode 3" for the deceleration state. The speed mode further includes a "mode 4" for a state performing stationary phase energization described later, and a "mode 0" for a state of energization off. The states corresponding to the respective modes are hereinafter referred to as "control states" where appropriate.

When the speed state of the motor 10 is mode 2 or mode 3, that is, the steady state or the deceleration state, the FB value setting section 63 performs phase lead compensation for leading the phase of the motor speed Msp, and designates a speed phase lead value Msp_pl as the speed feedback value Msp_fb. When the speed state of the motor 10 is mode 1, that is, the acceleration state, the FB value setting section 63 designates the motor speed Msp as the speed feedback value Msp_fb without performing phase lead compensation. It is assumed that the speed phase lead value Msp_pl is also included in a concept of the "motor speed".

The speed deviation computing section 64 computes a speed deviation ΔMsp between the target motor speed Msp* and the speed feedback value Msp_fb.

The controller 65 calculates an FB duty D_fb by performing P control or PI control, for example, such that the speed deviation ΔMsp becomes 0 with coincidence between the target motor speed Msp* and the speed feedback value Msp_fb.

The FF correction value computing section 66 calculates an FF duty D_ff corresponding to the speed state of the motor 10.

Figure 6A:
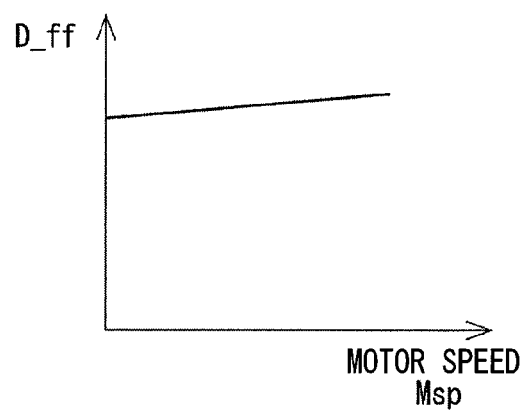
FIG. 6A is an explanatory diagram showing an FF duty in an acceleration state according to the first embodiment.

The FF duty D_ff in the acceleration state is a maximum acceleration duty calculated based on a map shown in FIG. 6A or others, and increases as the motor speed Msp becomes higher. In the present embodiment, such a value of the FF duty D_ff is computed which becomes a maximum duty for a period until the motor speed Msp reaches the target motor speed Msp* or higher.

Figure 6B:
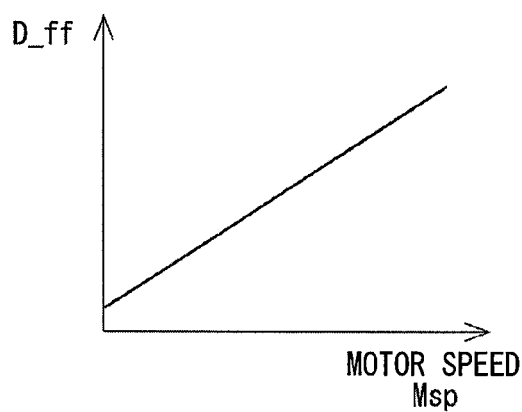
FIG. 6B is an explanatory diagram showing an FF duty in a steady state according to the first embodiment.

The FF duty D_ff in the steady state is a speed maintaining duty computed based on a map or the like shown in FIG. 6B. The speed maintaining duty is a duty for maintaining the motor speed Msp at no load, and increases as the motor speed Msp becomes higher.

Figure 6C:
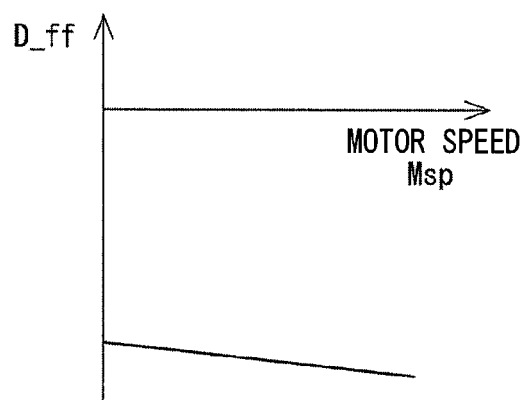
FIG. 6C is an explanatory diagram showing an FF duty in a deceleration state according to the first embodiment.

The FF duty D_ff in the deceleration state is a deceleration correction duty computed based on a map or the like shown in FIG. 6C. The deceleration correction duty is a correction duty for producing the target motor speed Msp*. The deceleration correction duty has a negative value when the motor 10 is rotating in the positive direction, and decreases as the motor speed Msp becomes higher. In other words, an absolute value of the deceleration correction duty becomes larger as the motor speed Msp increases.

FIGS. 6A to 6C show the motor 10 rotating in the positive direction. When the motor 10 rotates in the negative direction, the sign of the FF duty D_ff is inverted. In the present embodiment described herein, the FF duty D_ff is computed based on the motor speed Msp. However, the FF duty D_ff may be computed based on the target motor speed Msp* instead of the motor speed Msp.

The FF term correction section 67 corrects the FB duty D_fb using the FF duty D_ff to compute a duty command value. The FF term correction section 67 of the present embodiment is an adder which adds the FF duty D_ff to the FB duty D_fb to compute a duty command value D.

The voltage correction section 68 corrects the duty command value D based on a battery voltage V. A value obtained after voltage correction is hereinafter referred to as a "duty command value".

Based on the duty command value and the actual count value Cen, the PWM signal generation section 69 generates command signals related to switching of the switching elements 411 to 416 and 421 to 426. The PWM signal generation section 69 adjusts the command signals such that the motor current Im does not exceed a current limit value Im_max.

In the feedback control of the present embodiment, intensity of the current flowing through the coils 111 to 113 and 121 to 123 and torque can be varied by performing PWM control or the like for duty change.

According to the present embodiment, drive of the motor 10 is controlled by rectangular wave control with 120° energization. In rectangular wave control with 120° energization, the high-potential side switching element of the first phase and the low-potential side switching element of the second phase are turned on. In addition, the energization phase switches by switching of a combination of the first phase and the second phase for every 60 electrical degrees. In this case, a rotating magnetic field is generated in the winding sets 11 and 12, and rotates the motor 10. In the present embodiment, a rotation direction of the motor 10 at the time of rotation of the output shaft 15 in the positive rotation direction is defined as a positive direction. A duty at the time of output of positive torque from the motor 10 becomes positive, and a duty at the time of output of negative torque becomes negative, with a possible duty range covering from −100 [%] to 100 [%]. That is, the duty becomes positive at the time of positive rotation of the motor 10, and becomes negative at the time of negative rotation of the motor 10. When braking torque (i.e., negative torque) is generated to stop positive rotation of the motor 10, the rotation direction of the motor 10 is the positive rotation direction. However, the duty becomes negative. Similarly, when braking torque is generated to stop rotation of the motor 10 rotating in the negative direction, the duty becomes positive.

The stationary phase energization control section 70 performs stationary phase energization control. The stationary phase energization control, which is control for stopping the rotation of the motor 10, selects a stationary phase corresponding to an electrical angle, and controls the switching elements 411 to 416 and 421 to 426 such that a current flows in the selected stationary phase in a predetermined direction. As a result, an excitation phase is fixed. When the excitation phase is fixed, the motor 10 stops at a predetermined electrical angle corresponding to the excitation phase. Based on the actual count value Cen, the stationary phase energization control section 70 selects a stationary phase and an energization direction for allowing the motor 10 to stop at an electrical angle closest to a current rotor position.

The stationary phase energization control is control performed when the angular deviation e becomes equal to or smaller than an angle determination threshold e_th. During the stationary phase energization control, therefore, the actual count value Cen and the target count value Cen* are considered to be approximately in coincidence with each other. Accordingly, the motor 10 is allowed to stop at a position substantially coincident with the target count value Cen* by stopping at an electrical angle which is a possible stop angle closest to the current rotor position. Strictly speaking, the electrical angle corresponding to the target count value Cen* and the electrical angle at which the motor 10 stops under the stationary phase energization control deviate from each other by motor resolution at most. However, when a reduction ratio of the speed reducer 14 is large, deviation of the stop position of the output shaft 15 is small and produces no problem.

The switching control section 75 switches the control state of the motor 10. Particularly in the present embodiment, the switching control section 75 switches between feedback control and stationary phase energization control based on the angular deviation e.

The switching control section outputs drive signals corresponding to the control state to the motor drivers 41 and 42. In this manner, driving of the motor 10 is controllable.

A switching control process will be described with reference to a flowchart shown in FIG. 7. This process is executed by the ECU 50 in a predetermined cycle while the starting switch is turned on. Step S101 is hereinafter simply expressed as S101, using only a symbol "S" without "step". The same applies to the other steps.

In initial step S101, the ECU 50 determines whether or not the driver request shift range has been changed by operation of the not-shown shift lever by the driver. When it is determined that the driver request shift range has not been changed (S101: NO), the process proceeds to S103. When it is determined that the driver request shift range has been changed (S101: YES), the process proceeds to S102.

In S102, the ECU 50 turns on an energization flag for the motor 10. Processing for turning on or off the energization flag may be performed by the switching control section 75, or may be performed separately from the switching control section 75.

In S103, the switching control section 75 determines whether or not the energization flag has been turned on. When it is determined that the energization flag has been turned on (S103: YES), the process proceeds to S105.

In S104, the switching control section 75 resets a timer value Tc, which will be described later, to end this process.

In S105, the switching control section 75 determines whether or not the angular deviation e, which is a difference between the target count value Cen* and the actual count value Cen, is larger than an angle determination threshold e_th. In the present embodiment, the angular deviation e corresponds to "a difference between a target angle and an actual angle". The angle determination threshold value e_th is set to a count number corresponding to a predetermined value close to 0 (e.g., 0.5° in mechanical angle). When it is determined that the angular deviation e is equal to or smaller than the angle determination threshold e_th (S105: NO), the process proceeds to S107. When it is determined that the angular deviation e is larger than the angle determination threshold e_th (S 105: YES), the process proceeds to S106.

In S106, the switching control section 75 selects the feedback control as the control state of the motor 10. More specifically, when the angular deviation e is larger than the angle determination threshold e_th, the motor 10 is controlled under the feedback control for feeding back the motor position and the motor speed.

Figure 8:
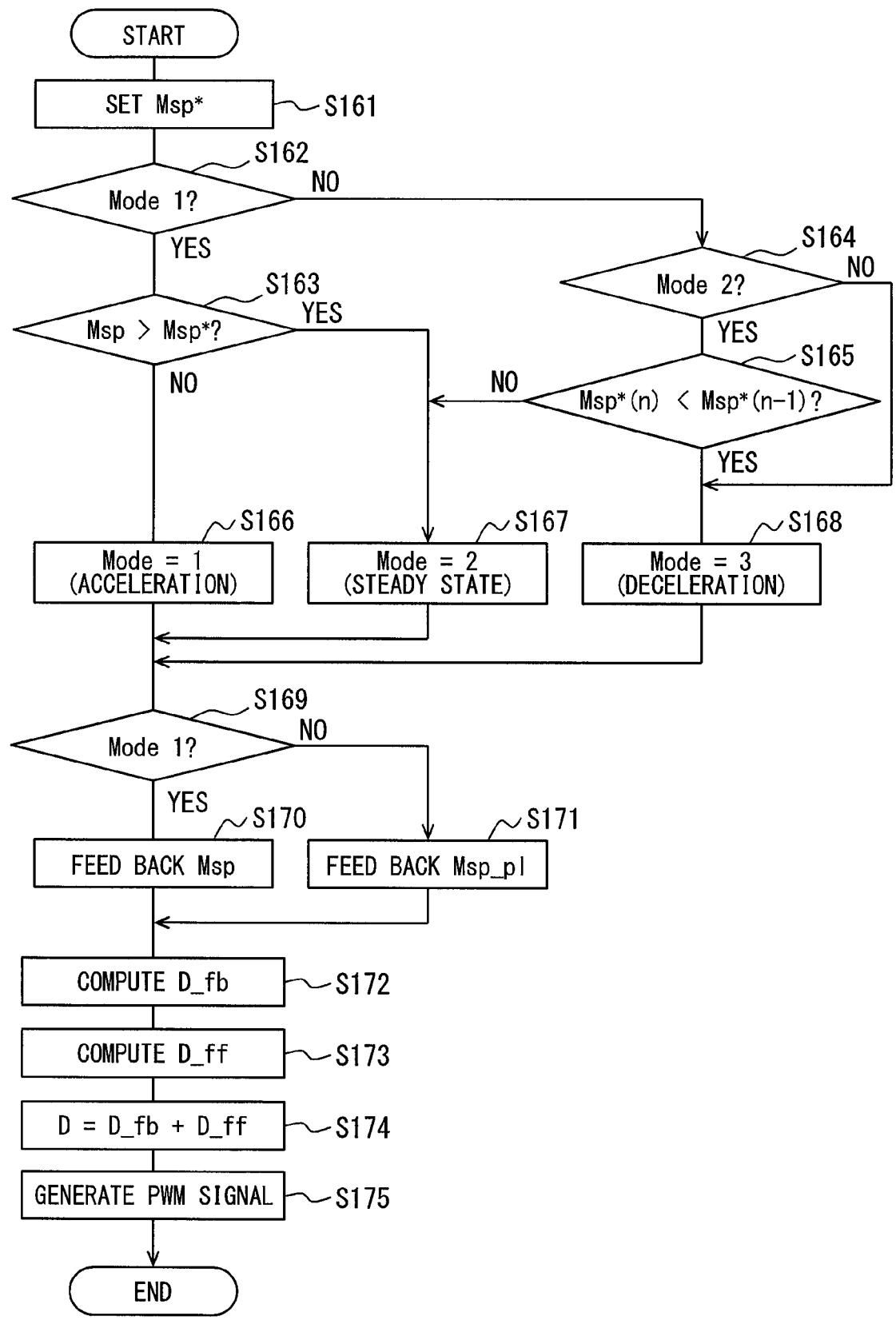
FIG. 8 is a flowchart showing feedback control according to the first embodiment.

FIG. 8 shows a sub-flow for explaining the FB control. Immediately after the energization flag is turned on, the speed state of the motor 10 is set to mode 1 (acceleration state).

In S161, the target speed setting section 62 sets the target motor speed Msp* based on the angular deviation e and the battery voltage V.

In S162, the feedback control section 60 determines whether or not the current speed state is mode 1. When it is determined that the current speed state is not mode 1 (S162: NO), the process proceeds to S164. When it is determined that the speed state is mode 1 (S162: YES), the process proceeds to S163.

In S163, the feedback control section 60 determines whether or not the motor speed Msp is higher than the target motor speed Msp*. When it is determined that the motor speed Msp is equal to or lower than the target motor speed Msp* (S163: NO), the process proceeds to S166, and maintains mode 1 as the speed state. When it is determined that the motor speed Msp is higher than the target motor speed Msp* (S163: YES), the process proceeds to S167 and switches the speed state from mode 1 (acceleration) to mode 2 (steady state).

In S164 to which the process proceeds when the current speed state is not determined to be mode 1 (S163: NO), the feedback control section 60 determines whether or not the current speed state is mode 2. When it is determined that the current speed state is not mode 2 (S164: NO), that is, when the current speed state is mode 3, the process proceeds to S168, and maintains mode 3 (deceleration) as the speed state. When it is determined that the current speed state is mode 2 (S164: YES), the process proceeds to S165.

In S165, the feedback control section 60 determines whether or not a current value of the target motor speed is smaller than a previous value of the target motor speed Msp*. In the Figure, the current value of the target motor speed is expressed as Msp*(n), and the previous value as Msp*(n−1). When it is determined that the current value Msp*(n) of the target motor speed is equal to or larger than the previous value Msp*(n−1) (S165: NO), the process proceeds to S167, and maintains mode 2 (steady state). When it is determined that the current value Msp*(n) of the target motor speed is smaller than the previous value Msp* (n−1) (S165: YES), the process proceeds to S168 and switches the speed state from mode 2 (steady state) to mode 3 (deceleration).

In S169 subsequent to steps S166 to S168, the feedback control section 60 determines whether or not the speed state of the motor 10 is mode 1. When it is determined that the speed state is mode 1 (S169: YES), the process proceeds to S170. When it is determined that the speed state is not mode 1 (S169: NO), that is, when the speed state is mode 2 or mode 3, the process proceeds to S171.

In S170, the FB value setting section 63 outputs the motor speed Msp as the speed feedback value Msp_fb to the speed deviation computing section 64.

In step S171, the FB value setting section 63 outputs the phase lead compensation value Msp_pl as the speed feedback value Msp_fb to the speed deviation computing section 64.

In S172, the controller 65 computes the FB duty D_fb.

In S173, the FF correction value computing section 66 calculates the FF duty D_ff corresponding to the speed state.

In S174, the FF term correction section 67 adds the FB duty D_fb and the FF duty D_ff to compute the duty command value D.

In S175, the PWM signal generation section 69 generates PWM signals based on the voltage-corrected duty command value D. Based on the generated PWM signals, driving of the motor 10 is controlled by controlling on-off operation of the switching elements 411 to 416 and 421 to 426.

Now return to FIG. 7. In S107 to which the process proceeds when the angular deviation e is determined to be equal to or smaller than the angle determination threshold value e_th (S105: NO), the switching control section 75 increments a timer value Tc which is a count value for measuring duration of the stationary phase energization control.

In S108, the switching control section 75 determines whether or not the timer value Tc is shorter than a duration determination threshold Tth. The duration determination threshold Tth is a value set in accordance with an energization duration time Ta (e.g., 100 ms) for continuing the stationary phase energization control. When it is determined that the timer value Tc is shorter than the duration determination threshold Tth (S108: YES), the process proceeds to S109. When it is determined that the timer value Tc is equal to or longer than the duration determination threshold Tth, the process proceeds to S110.

In S109 to which the process proceeds when the energization duration time Ta has not elapsed yet from a start of the stationary phase energization control, the switching control section 75 selects the stationary phase energization control as the control state of the motor 10.

In S110 to which the process proceeds when the energization duration time has elapsed from the start of the stationary phase energization control, the switching control section 75 performs energization off control for the control state of the motor 10. Under the energization off control, signals for turning off all the switching elements 411 to 416, and 421 to 426 of the motor drivers 41 and 42 are output to the motor drivers 41 and 42 to turn off the switching elements 411 to 416 and 421 to 426. In this case, power is not supplied to the motor 10 side under the energization off control. The motor relays 46 and 47 are kept turned on while the starting switch is turned on. Accordingly, the motor relays 46 and 47 are turned on during the energization off control. The ECU 50 turns off the energization flag.

Figure 9:
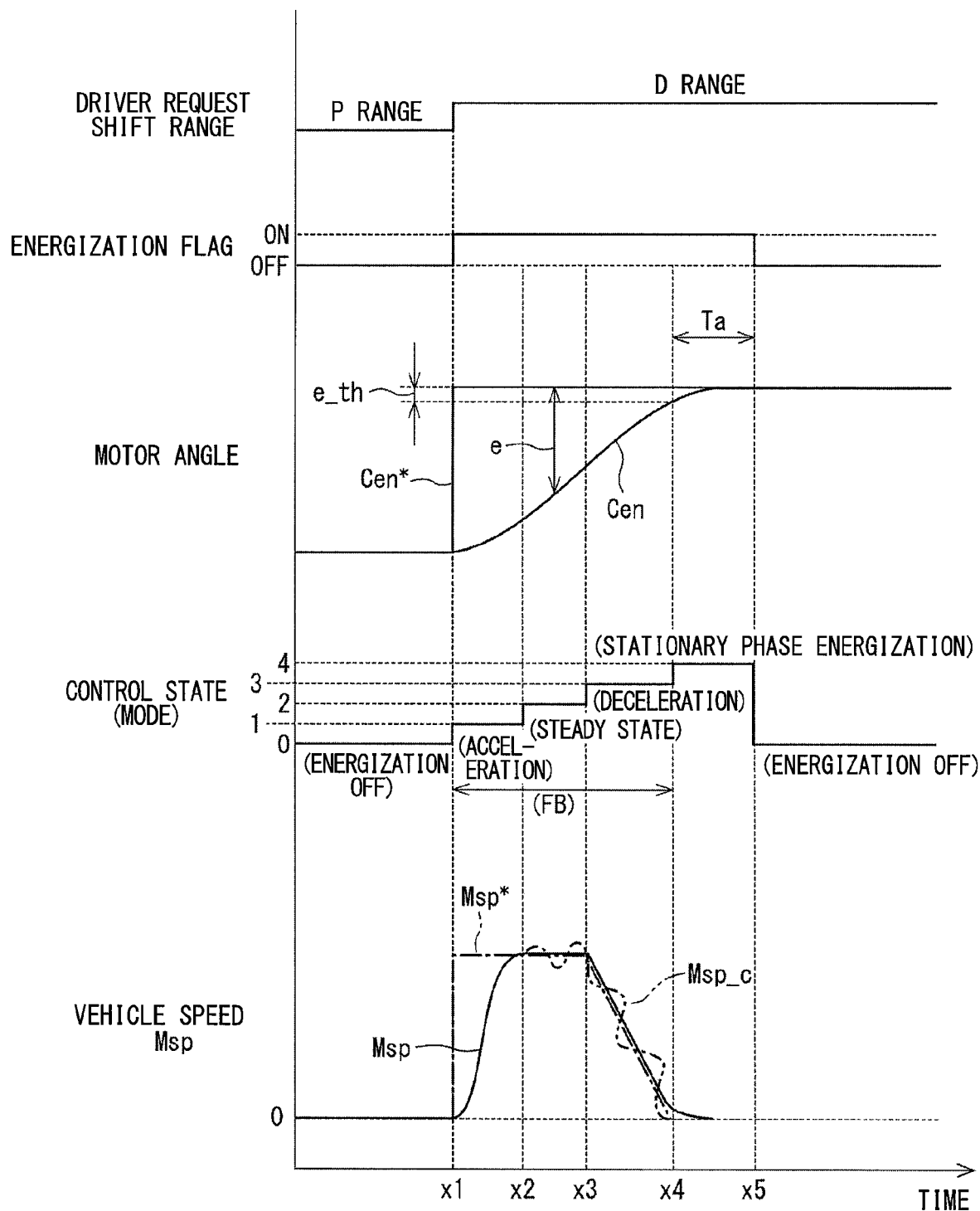
FIG. 9 is a time chart showing the switching control process according to the first embodiment.

The switching control process will be described with reference to a time chart shown in FIG. 9. FIG. 9 shows a driver request shift range, an energization flag, an angle of the motor 10, a control state of the motor 10, and a motor speed in this order from the upper stage of the figure which shows a horizontal axis as a common time axis. The angle of the motor 10 is represented by a count value of the encoder 13.

When the driver request shift range is maintained at P range before time x1, the control state of the motor 10 is set to the energization off control as shown in FIG. 9.

When the driver request shift range changes from P range to D range at time x1, the energization flag is switched from off to on. The switching control section 75 switches the control state of the motor 10 from the energization off control to the feedback control.

Furthermore, the target count value Cen* corresponding to the driver request shift range is set. Immediately after the time x1 at which the request shift range is switched, the speed state of the motor 10 is set to mode 1 (acceleration state). The motor 10 is controlled with a maximum acceleration duty. In the acceleration state, the motor speed Msp not subjected to the phase lead compensation is fed back.

When the motor speed Msp coincides with the target motor speed Msp* at time x2, the speed state is switched to mode 2 (steady state). In the steady state, the FF duty D_ff is set to a speed maintenance duty, and the phase lead compensation value Msp_pl is fed back.

At time x3, the target motor speed Msp* starts to decrease. In this case, the speed state is switched to mode 3

(deceleration state). In the deceleration state, the FF duty D_ff is set to a deceleration correction duty, and the phase lead compensation value Msp_pl is fed back.

The speed state may be determined in any manners, such as use of a differential value of the motor speed Msp.

In the present embodiment, the feedback control for feeding back the actual count value Cen as the motor position and the motor speed Msp is performed to increase responsiveness. When the feedback gain is raised here to increase responsiveness in the feedback control, hunting of the motor speed Msp may be caused as a result of a detection delay of a rotation angle of the motor 10 or depending on resolution of detection. As in a reference example indicated by a two-dot chain line, hunting is easily caused in the steady state and deceleration state.

According to the present embodiment, therefore, the speed phase lead value Msp_pl, which is the speed feedback value Msp_fb subjected to the phase lead compensation, is fed back when the speed state is the steady state or the deceleration state. As a result, hunting of the motor speed Msp during the steady state and the deceleration can be reduced as indicated by a solid line.

In FIG. 9, the target motor speed Msp* is indicated by a one-dot chain line, which is slightly shifted from the motor speed Msp indicated by a solid line to avoid overlapping of these lines. However, in the steady state and the deceleration state, substantial coincidence between the motor speed Msp and the target motor speed Msp* is desired to be achieved by feeding back the phase lead value Msp_pl.

When the angular deviation e, which is a difference between the target count value Cen* and the actual count value Cen, is equal to or smaller than the angle determination threshold e_th at time x4, the control state of the motor 10 is switched from the feedback control to the stationary phase energization control. The motor 10 can be rapidly stopped by the stationary phase energization.

The stationary phase energization control is continued for a period from time x4 to time x5 when the energization duration time Ta has elapsed. This control securely stops the motor 10. Accordingly, the detent roller 26 can be securely fitted into the desired recess.

At time x5 after the elapse of the energization duration time Ta from the start of the stationary phase energization control, the control state is switched to the energization off control with the energization flag turned off. The off-state of the energization flag is maintained until the driver request shift range is again switched. In this case, the energization off control is continued as the control state of the motor 10. As a result, the motor 10 is not energized other than occasions of shift range switching. Accordingly, power consumption decreases in comparison with power consumption when energization continues.

While FIG. 9 shows the example of switching of the driver request shift range from P range to D range, another range control can be performed in a similar manner.

In the present embodiment, the motor 10 as an actuator of the shift-by-wire system 1 is constituted by a DC brushless motor. By using the DC brushless motor, responsiveness and efficiency improve in comparison with a case using an SR motor, for example. Particularly when the difference between the target count value Cen* and the actual count value Cen is large, responsiveness can be raised by selecting the feedback control.

When the feedback gain is raised to improve responsiveness, for example, hunting may be caused during the steady state or deceleration state selected as the speed state. According to the present embodiment, therefore, the phase lead value Msp_pl subjected to phase lead filtering is fed back when the speed state is the steady state or the deceleration state. In this manner, hunting during the steady state and the deceleration can be reduced.

Furthermore, when the actual count value Cen approaches the target count value Cen*, the feedback control is switched to the stationary phase energization control to stop the motor 10 at a predetermined position without hunting. In this manner, reduction of hunting, and an appropriate stop of the motor 10 can be achieved.

According to the present embodiment, therefore, improvement of responsiveness at an initial stage of the shift switching, and stability at completion of the shift switching are both achievable by using a DC brushless motor as the actuator of the shift-by-wire system 1, and by switching between the feedback control and the stationary phase energization control.

As described above, the shift range control device 40 of the present embodiment switches the shift range by controlling driving of the motor 10, and includes the feedback control section 60, the stationary phase energization control section 70, and the switching control section 75.

The feedback control section 60 performs feedback control based on an actual angle (actual count value Cen in the present embodiment) of the motor 10, and the motor speed Msp which is a rotation speed of the motor 10.

The stationary phase energization control section 70 performs stationary phase energization control to energize the stationary phase selected according to the actual angle.

The switching control section 75 switches the control state of the motor 10.

When the request shift range is switched, the switching control section 75 switches the control state to the feedback control. When the angular deviation e, which is a difference between the target count value Cen* as a target angle determined according to the request shift range and the actual count value Cen, becomes equal to or smaller than the angle determination threshold e_th, the switching control section 75 switches the control state from the feedback control to the stationary phase energization control.

In the present embodiment, responsiveness can be raised by selecting the feedback control when the request shift range is switched. Particularly in the present embodiment, improvement of responsiveness with reduction of overshooting and hunting is achievable by using the actual angle as the motor position and the motor speed Msp for feedback control.

Furthermore, the motor 10 can be appropriately stopped by switching the feedback control to the stationary phase energization control when the actual angle approaches the target angle.

In this manner, driving of the motor 10 associated with switching of the shift range can be appropriately controlled.

The switching controller 75 continues the stationary phase energization control until the energization duration time Ta elapses after switching from the feedback control to the stationary phase energization control. When the energization duration time Ta elapses after switching to the stationary phase energization, the switching control section 75 switches the control to the energization off control for cutting off energization to the motor 10.

The motor 10 can be securely stopped by continuing the stationary phase energization control for the energization duration time Ta. Moreover, power consumption can be reduced by setting the energization off control after the elapse of the energization duration time Ta.

The feedback control section 60 includes the target speed setting section 62 and the controller 65. The target speed setting section 62 sets the target motor speed Msp*, which is a target speed of the motor 10, based on an angular deviation.

The controller 65 computes, as a feedback duty command value, such a value of the FB duty D_fb which achieves coincidence between the target motor speed Msp* and the motor speed Msp. As described above, the "motor speed" here is not limited to the motor speed Msp, but includes the phase lead value Msp_pl subjected to phase lead compensation.

Accordingly, feedback control using the actual count value Cen and the motor speed Msp can be appropriately performed.

Second Embodiment

Figure 10:
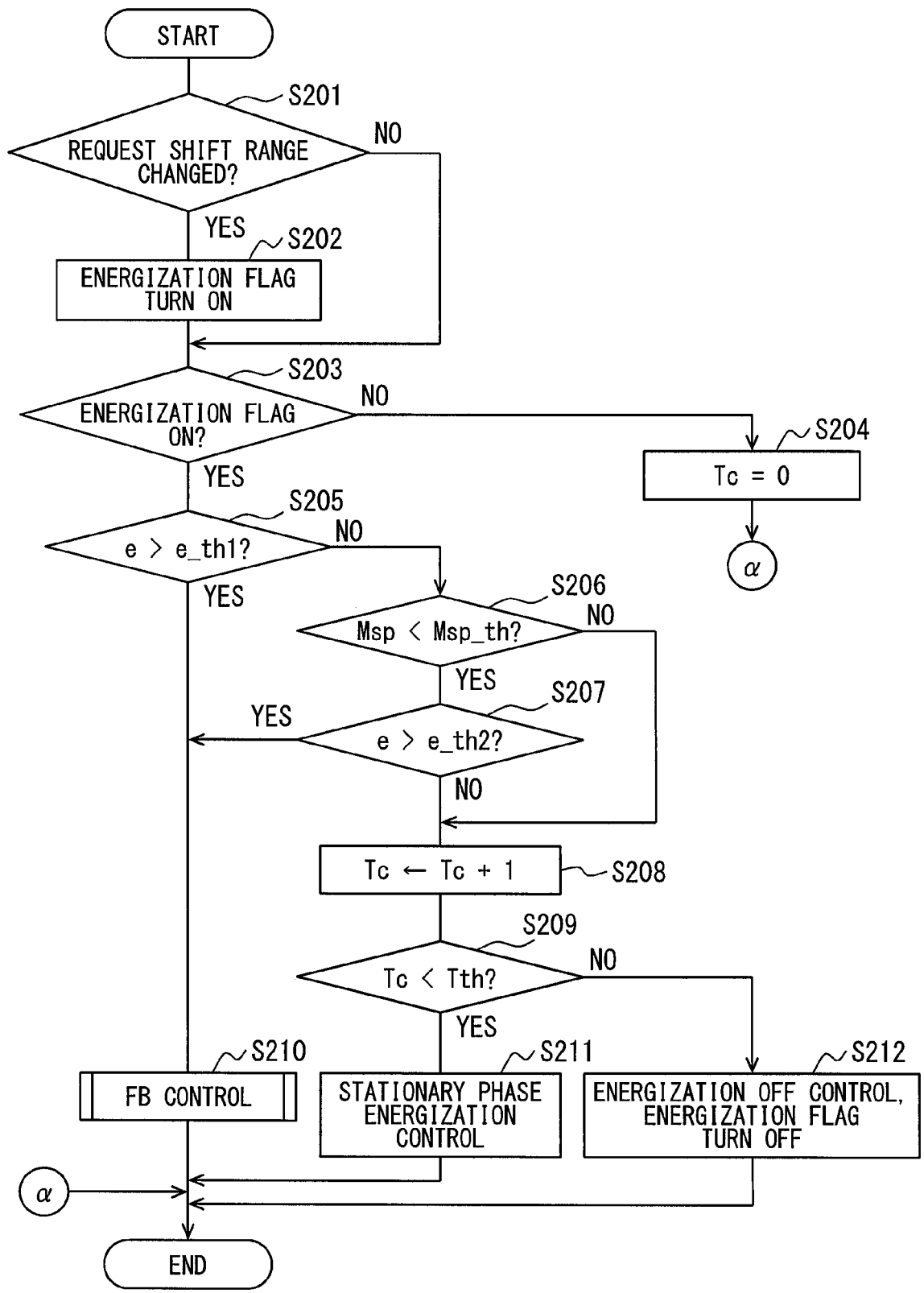
FIG. 10 is a flowchart showing a switching control process according to a second embodiment.

FIGS. 10 and 11 show a second embodiment. A switching control process of the present embodiment is different from the corresponding process of the above embodiment, and therefore will be chiefly described hereinafter.

The switching control process according to the present embodiment will be described with reference to a flowchart shown in FIG. 10.

Figure 7:
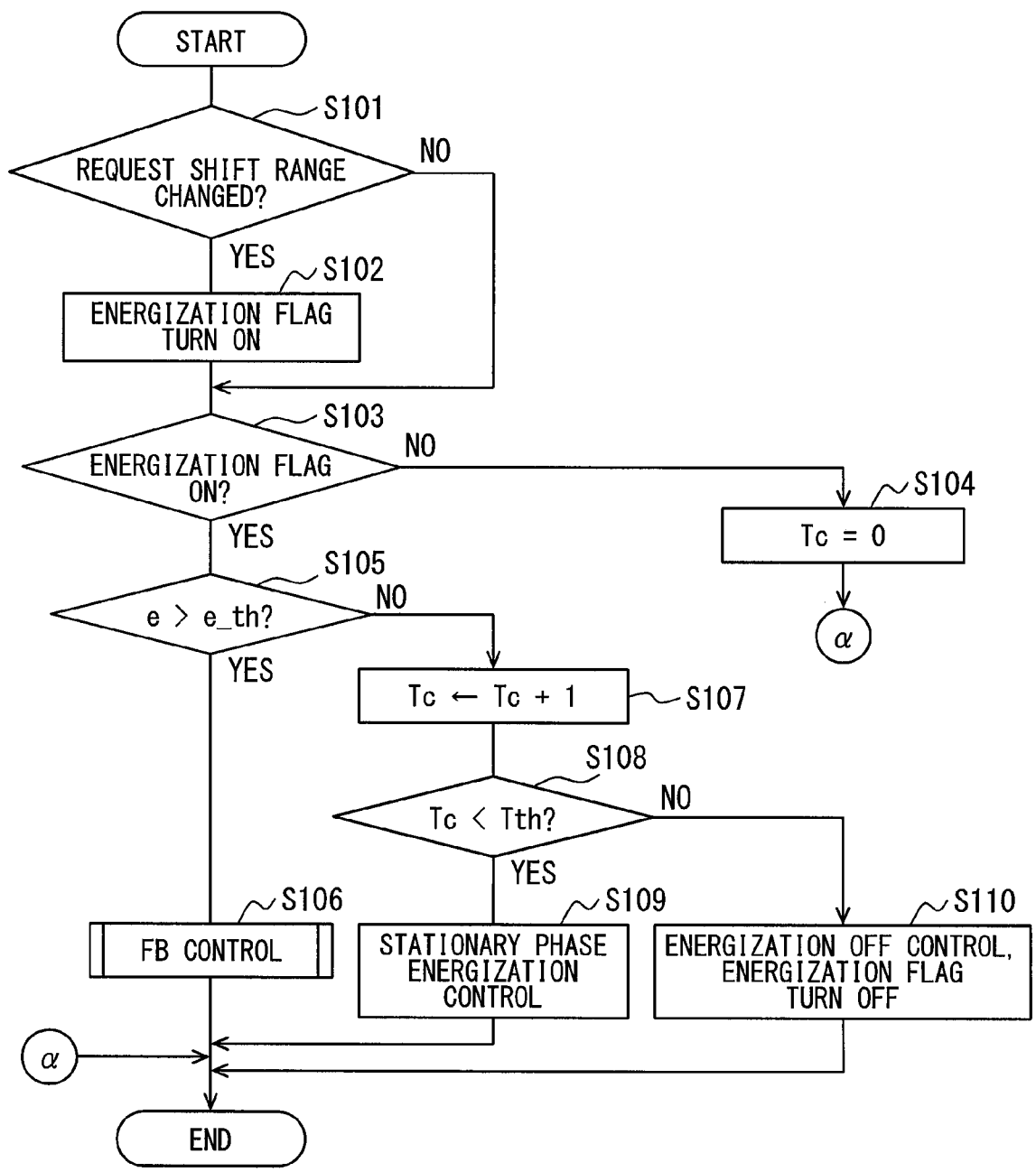
FIG. 7 is a flowchart showing a switching control process according to the first embodiment.

Processing of S201 to S204 is similar to processing of S101 to S104 in FIG. 7.

In S205, the switching control section 75 determines whether or not the angular deviation e is larger than a first angle determination threshold e_th1. The first angle determination threshold e_th1 is set to a count number corresponding to a value at which no overshoot occurs when the motor 10 having the high motor speed Msp, that is, rotating at a high speed, is stopped (e.g., 1° in mechanical angle). The first angle determination threshold value e_th1 is set to a value larger than a second angle determination threshold value e_th2 described below. Accordingly, e_th1>e_th2 holds.

When it is determined that the angular deviation e is larger than the first angle determination threshold e_th1 (S205: YES), the process proceeds to S210 to perform FB control for the motor 10. When it is determined that the angular deviation e is equal to or smaller than the first angle determination threshold e_th1 (S205: NO), the process proceeds to S206.

In S206, the switching control section 75 determines whether or not the motor speed Msp is lower than a speed determination threshold Msp_th. The speed determination threshold value Msp_th is a value for determining whether or not the motor 10 is rotating at a high speed, and is set to 800 [rpm], for example. The speed determination threshold value Msp_th may be set to any value. When it is determined that the motor speed Msp is equal to or higher than the speed determination threshold Msp_th (S206: NO), the process proceeds to S208. When it is determined that the motor speed Msp is lower than the speed determination threshold Msp_th (S206: YES), the process proceeds to S207.

In S207, the switching control section 75 determines whether or not the angular deviation e is larger than the second angle determination threshold e_th2. For example, the second angle determination threshold value e_th2 is set to any value substantially equal to the angle determination threshold value e_th of the first embodiment. When it is determined that the angular deviation e is larger than the second angle determination threshold e_th2 (S 207: YES), the process proceeds to S210. When it is determined that the angular deviation e is equal to or smaller than the second angle determination threshold e_th2 (S207: NO), the process proceeds to S208.

Processing of S208 and S209 is similar to processing of S107 and S108.

Moreover, processing of S210 is similar to processing of S106, and processing of S211 and S212 is similar to processing of S109 and S110.

When the angular deviation e becomes a value smaller than the angle determination threshold value e_th1 larger than the second angle determination threshold e_th2 in a state where the motor speed Msp is equal to or higher than the speed determination threshold Msp_th, that is, when the rotation speed of the motor 10 is relatively high in the present embodiment, the control shifts from the FB control to the stationary phase energization control to stop the motor 10.

On the other hand, in a state where the motor speed Msp is lower than the speed determination threshold Msp_th, that is, the rotation speed of the motor 10 is relatively slow, the FB control continues until the angular deviation e becomes the second angle determination threshold e_th2. When the angular deviation e becomes smaller than the second angle determination threshold value e_th2, the control shifts to the stationary phase energization control.

Figure 11A:
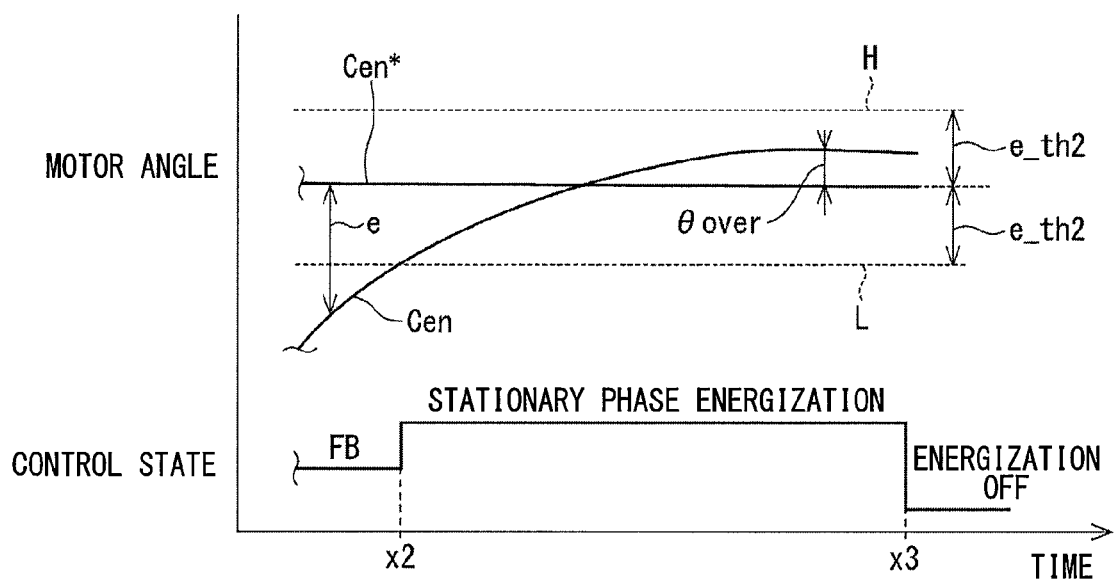
FIG. 11A is an explanatory diagram showing an overshoot amount according to the second embodiment.

In the example shown in FIG. 11A, the feedback control is switched to the stationary phase energization control to stop the motor 10 when the angular deviation e becomes smaller than the second angle determination threshold e_th2. In the present embodiment, the control range is set to the target count value Cen*±e_th2. In other words, the second angle determination threshold e_th2 is set in accordance with the control range.

An excess amount of the actual stop position of the motor 10 from the target count value Cen* is referred to as an overshoot amount θover.

Figure 11B:
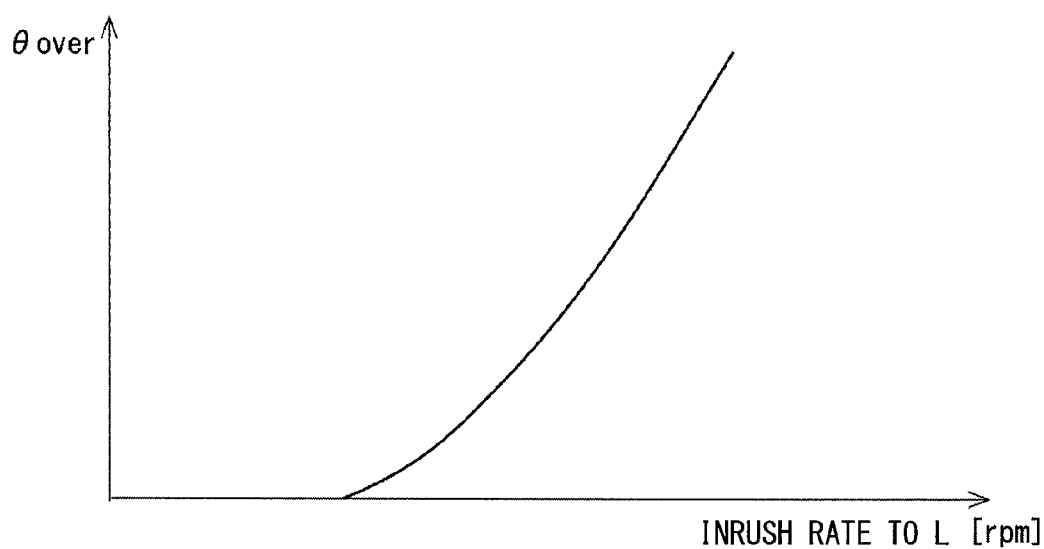
FIG. 11B is an explanatory diagram showing a relationship between an inrush rate to a control lower limit and the overshoot amount according to the second embodiment.

As shown in FIG. 11B, the overshoot amount θover becomes larger as an inrush speed to a control lower limit value L increases. Accordingly, in a state where the rotation speed of the motor 10 is high and that the angle determination threshold is relatively small, the stop position of the motor 10 may exceed a control upper limit value H when the control is switched to the stationary phase energization control immediately before the target position. On the other hand, in a state where the rotation speed of the motor 10 is high and that the angle determination threshold is set to a relatively large value to avoid overshoot, the motor 10 may stop before a control lower limit value L when the rotation speed of the motor 10 is small.

According to the present embodiment, therefore, the switching control section 75 changes the angle determination threshold in accordance with the motor speed Msp, which is a rotation speed of the motor 10. Specifically, when the motor speed Msp is lower than the speed determination threshold Msp_th, the angle determination threshold is set to the second angle determination threshold e_th 2. When the angular deviation e becomes equal to or smaller than the second angle determination threshold e_th2, the control switches from the feedback control to the stationary phase energization control. When the motor speed Msp is equal to or higher than the speed determination threshold value Msp_th, the angle determination threshold value is set to the first angle determination threshold value e_th1 larger than the second angle determination threshold value e_th2. When the angular deviation becomes equal to or smaller than the first angle determination threshold value e_th1, the control switches from the feedback control to the stationary phase energization control.

In other words, according to the present embodiment, the control switches to the stationary phase energization control at a position before and farther from the target position as the motor speed Msp becomes higher.

An error between the stop position of the motor and the target position can be reduced by varying the time of switching from the feedback control to the stationary phase energization control in accordance with the motor speed Msp. Accordingly, the motor 10 can be securely stopped within the control range.

Effects similar to the effects of the embodiment described above are also produced.

Other Embodiments

In the embodiments described above, the motor is constituted by a permanent magnet type three-phase brushless motor. In a different embodiment, the motor may be any types of motor as long as the motor can switch between the feedback control and the stationary phase energization control. In the embodiments described above, two pairs of the winding sets are included in the motor. In a different embodiment, one pair or three or more pairs of the winding sets of the motor may be provided.

In the embodiments described above, rectangular wave control with 120° energization is performed in the feedback control. In a different embodiment, rectangular wave control with 180° energization may be performed in the feedback control. In addition to the rectangular wave control, PWM control using a triangular wave comparison method or an instantaneous vector selection method may be used.

In the embodiments described above, an encoder is used as the rotation angle sensor for detecting the rotation angle of the motor. In a different embodiment, the rotation angle sensor may be of any types such as a resolver, rather than an encoder. A value other than an encoder count value and convertible into a rotation angle of the motor may be fed back instead of the count value of the encoder. This is applicable to selection of a stationary phase in the stationary phase energization control.

In the embodiments described above, a phase lead value subjected to the phase lead filtering is fed back when the speed state is the steady state or the deceleration state. In a different embodiment, the value subjected to the phase lead filtering may be fed back even when the speed state is the acceleration state. In addition, the phase lead filtering in at least one of the steady state and the deceleration state may be omitted.

In the second embodiment, one speed determination threshold is used for switching between the first angle determination threshold and the second angle determination threshold. In a different embodiment, a plurality of speed determination thresholds may be used to achieve stepped switching of the angle determination threshold in such a manner that the angle determination threshold becomes larger as the motor speed increases. The angle determination threshold may be set based on a function, a map, or the like corresponding to the motor speed.

In the embodiments described above, the four recesses are formed in the detent plate. In a different embodiment, the number of the recesses is not limited to four, but may be any number. For example, two recesses may be provided in the detent plate to allow switching between P range and notP range. The shift range switching mechanism, the parking lock mechanism, and the like may be different from the corresponding mechanisms of the above embodiments.

The present disclosure is not limited to the embodiments described herein. The present disclosure may be practiced in various modes without departing from the scope and spirit of the disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device for switching a shift range by controlling driving of a motor, the shift range control device comprising:
   an angle computing section configured to compute an actual angle of the motor based on a signal of a rotation angle sensor that detects a rotation angle of the motor;
   a speed computing section configured to compute a motor speed, which is a rotation speed of the motor, based on the actual angle;
   a feedback control section configured to perform a feedback control based on the actual angle and the motor speed;
   a stationary phase energization control section configured to perform a stationary phase energization control which energizes a stationary phase selected according to the actual angle; and
   a switching control section configured to switch a control state of the motor, wherein:
   the feedback control section includes
      a target speed setting section that sets a target speed of the motor based on an angular deviation which is a deviation between a target angle determined according to a request shift range and the actual angle, and
      a controller that computes a feedback duty command value to cause the target speed and the motor speed to coincide with each other;
   the switching control section selects the feedback control for the control state when the request shift range is switched; and
   the switching control section switches the control state from the feedback control to the stationary phase energization control when the angular deviation is equal to or smaller than an angle determination threshold;
   the switching control section continues the stationary phase energization control until an elapse of an energization duration time after switching from the feedback control to the stationary phase energization control; and
   the switching control section switches the control state to an energization off control which cuts off energization to the motor after the elapse of the energization duration time from switching to the stationary phase energization control.

2. The shift range control device according to claim 1, wherein
   the switching control section changes the angle determination threshold in accordance with the motor speed.

3. A shift range control device for switching a shift range by controlling driving of a motor, the shift range control device comprising:

an angle computing section configured to compute an
actual angle of the motor based on a signal of a rotation
angle sensor that detects a rotation angle of the motor;

a speed computing section configured to compute a motor
speed, which is a rotation speed of the motor, based on
the actual angle;

a feedback control section configured to perform a feedback control based on the actual angle and the motor
speed;

a stationary phase energization control section configured
to perform a stationary phase energization control
which energizes a stationary phase selected according
to the actual angle; and a switching control section configured to switch a control
state of the motor, wherein:

the feedback control section includes
a target speed setting section that sets a target speed of
the motor based on an angular deviation which is a
deviation between a target angle determined according to a request shift range and the actual angle, and
a controller that computes a feedback duty command
value to cause the target speed and the motor speed
to coincide with each other;

the switching control section selects the feedback control
for the control state when the request shift range is
switched;

the switching control section switches the control state
from the feedback control to the stationary phase
energization control when the angular deviation is
equal to or smaller than an angle determination threshold; and the feedback control section includes:

a feedback value setting section that sets a speed feedback
value for feedback according to a speed state of the
motor, wherein the speed state includes an acceleration state, a steady
state, and a deceleration state.

4. The shift range control device according to claim 3,
wherein
the feedback value setting section is configured
to perform a phase lead compensation for leading a phase
of the motor speed, when the speed state is the steady
state or the deceleration state, and to designate a speed
phase lead value as the speed feedback value, and
to refrain from performing the phase lead compensation
when the speed state is the acceleration state, and to
designate the motor speed as the speed feedback value.

5. The shift range control device according to claim 1,
wherein the feedback control section includes a feedforward correction value computing section that computes a feedforward duty according to the motor speed.

6. The shift range control device according to claim 5,
wherein
the feedforward correction value computing section varies computation of the feedforward duty depending on
the acceleration state, the steady state and the deceleration state.

7. A shift range control device for switching a shift range
by controlling driving of a motor, the shift range control
device comprising:
a microcomputer configured to
compute an actual angle of the motor based on a signal
of a rotation angle sensor that detects a rotation angle
of the motor;
compute a motor speed, which is a rotation speed of the
motor, based on the actual angle;
perform a feedback control based on the actual angle
and the motor speed;
perform a stationary phase energization control which
energizes a stationary phase selected according to the
actual angle; and
switch a control state of the motor, wherein
in the feedback control, the microcomputer sets a target
speed of the motor based on an angular deviation which
is a deviation between a target angle determined
according to a request shift range and the actual angle,
and computes a feedback duty command value to cause
the target speed and the motor speed to coincide with
each other;
the microcomputer selects the feedback control for the
control state when the request shift range is switched;
the microcomputer switches the control state from the
feedback control to the stationary phase energization
control when the angular deviation is equal to or
smaller than an angle determination threshold;
the microcomputer is further configured to continue the
stationary phase energization control until an elapse of
an energization duration time after switching from the
feedback control to the stationary phase energization
control; and
the microcomputer is further configured to switch the
control state to an energization off control which cuts
off energization to the motor after the elapse of the
energization duration time from switching to the stationary phase energization control.

* * * * *